US012571689B2

(12) United States Patent
Acton

(10) Patent No.: US 12,571,689 B2
(45) Date of Patent: Mar. 10, 2026

(54) TEST FIXTURE FOR USE WITH A THERMOMETER TEST BATH

(71) Applicant: W.L. Walker Co., Inc., Tulsa, OK (US)

(72) Inventor: James Acton, Tulsa, OK (US)

(73) Assignee: W.L. Walker Co., Inc., Tulsa, OK (US)

( * ) Notice: Subject to any disclaimer, the term of this patent is extended or adjusted under 35 U.S.C. 154(b) by 0 days.

(21) Appl. No.: 19/097,471

(22) Filed: Apr. 1, 2025

(65) Prior Publication Data

US 2025/0305893 A1     Oct. 2, 2025

Related U.S. Application Data

(60) Provisional application No. 63/572,728, filed on Apr. 1, 2024.

(51) Int. Cl.
*G01K 15/00* (2006.01)

(52) U.S. Cl.
CPC ......... *G01K 15/002* (2013.01); *G01K 15/005* (2013.01); *G01K 15/007* (2013.01)

(58) Field of Classification Search
CPC ... G01K 15/002; G01K 15/005; G01K 15/007
USPC .......................................................... 374/1, 3
See application file for complete search history.

(56) References Cited

U.S. PATENT DOCUMENTS 4,050,289 A * 9/1977 Fairbairn ............... G01K 15/00
374/3
2024/0344905 A1* 10/2024 Larsen ................... G01K 19/00

FOREIGN PATENT DOCUMENTS

| CN | 105758558 A | | 7/2016 | |
| CN | 109115374 A | * | 1/2019 | .......... G01K 15/005 |
| CN | 115342945 A | * | 11/2022 | .......... G01K 15/005 |
| EP | 3379221 A1 | * | 9/2018 | .......... G01K 15/007 |
| EP | 3441728 A1 | * | 2/2019 | .......... G01K 15/002 |
| KR | 102453896 B1 | | 10/2022 | |

* cited by examiner

*Primary Examiner* — Mirellys Jagan
(74) *Attorney, Agent, or Firm* — GableGotwals

(57) ABSTRACT

A test device and method of this disclosure maintain stable bath temperature of a calibration bath. The test device includes a base that introduces vortex flow of liquids from the calibration bath into a hollow interior of a cylinder containing a reference and a test thermometer, the vortex flow of liquids then exiting a cap at the upper end of the cylinder and returning to the bath. The test device is partially surrounded by the liquids of the calibration bath. In some embodiments, the calibration bath is a circulating calibration bath. The test device and method of its use maintain bath temperature within at least ±0.01° F. (±0.0056° C.) about a predetermined bath working temperature.

16 Claims, 3 Drawing Sheets

TEST FIXTURE FOR USE WITH A THERMOMETER TEST BATH

CROSS-REFERENCE TO CO-PENDING APPLICATIONS

This application claims priority to, and the benefit of, U.S. 63/572,728 filed 1 Apr. 2024, the content of which is incorporated herein by reference.

BACKGROUND

This disclosure is in the field of systems and methods used to certify or verify thermometers such as, but not limited to, liquid-in-glass ("LIG") thermometers, portable electronic thermometers ("PET"), and digital contact thermometers ("DCT") of the kind, or similar to, those used to monitor temperatures in oil and gas well bores and reservoirs as well as in refineries and in industries that demand high accuracy such as, but not limited to, the food and beverage industry. A non-limiting example of this type of thermometer is an ASTM E or E-1 thermometer or ASTM digital contact thermometer D02. All of the thermometers must meet certain requirements and standards, for example ASTM standards and the like or those published by governing bodies or industry groups.

For example, ASTM E thermometers are certified against standards set by the National Institute of Standards and Technology and must be continually certified or verified during their use. For example, federal regulations and contracts require regulated organizations and contractors to verify the measurements they make are traceable and to support the claim of traceability by auditing records of equipment used in the calibration process. To establish an audit trail for traceability, a proper calibration or certification result includes the assigned value, a stated uncertainty, the identification of the standards used in the calibration, and the specification where correction factors should be applied if the standard or thermometer were to be used under different conditions.

The American Petroleum Institute's ("API") Chapter 7 states that before each LIG thermometer's initial use and at least once a year after the initial use, each thermometer" "hall be compared to a thermometer certified by the National Institute of Standards and Technology (NIST) or an equivalent thermometer of traceable accuracy. The comparison shall be made at three or more temperatures to ensure that the thermometer is accurate. Typically, the checkpoints should be 10%, 50%, and 90% of the range in which the thermometer is expected to be used." Similarly, before initial use, and at least once a year thereafter, the API Chapter 7 states each portable electronic thermometer "shall be compared at three or more temperature points, near the mid point and ends of the range; with either a National Institute of Technology (NIST) certified reference thermometer or an equivalent thermometer with accuracy traceable to the NIST. The PET shall be calibrated in accordance with the manufacturer's instructions."

Prior art methods to certify LIG, PET, and DCT thermometers typically make use of a calibration test bath into which a master or reference thermometer and one or more thermometers to be tested or certified are inserted. The bath includes a tank containing a liquid, a circulating pump, heating and cooling coils, and a temperature control. The liquid circulates within the tank between the topmost and bottommost ends of the tank, with at least a portion of the thermometer, including the bulb, submersed in the liquid.

Typically, the temperature of the bath remains substantially constant within an inch or so of its walls. However, no means are provided for precisely positioning the reference thermometer or test thermometer within the bath. Some users lay the thermometers in the bath, other users make use of a gantry-type device to position the thermometers in the bath. Therefore, a need exists for a device that can precisely position the thermometers or probes in a bath as well as ensure a each thermometer is exposed to a substantially same temperature of a test liquid.

SUMMARY

Embodiments of a test fixture of this disclosure are adapted for use with a calibration bath (not shown) and create a circulation pattern different than that which is occurring in the calibration bath that surrounds the test fixture. The test fixture places a reference or master (primary) thermometer or probe and one or more thermometers or probes under test at predetermined locations relative to one another and at a predetermined and adjustable depth. A portion of the liquid entering or circulating in the bath is diverted into the test fixture where it contacts the thermometers or probes. The liquid circulating within the test fixture has a vortex flow pattern as it contacts the curved wall of the fixture works its way up the test fixture. The liquid then exits the test fixture and returns to the bath by overlaying and cascading down the tube, thereby adding a layer of insulation.

The test fixture improves upon the temperature stability of the bath and helps maintain temperature stability of the liquid coming into contact with the thermometers or probes T, M within the test fixture. In embodiments, temperature stability may be maintained within $\pm 0.01°$ F. ($\pm 0.0056°$ C.) over a bath working temperature of $400°$ F. ($\sim 204°$ C.). In other embodiments, temperature stability is maintained in a predetermined bath working temperature in a range of $32°$ F. to $400°$ F. ($0°$ C. to $\sim 204°$ C.).

In embodiments of a method of this disclosure, a first liquid stream is circulated in a first circulation pattern in a calibration test bath, the first liquid stream surrounding at least a portion of a test fixture of this disclosure, and a second liquid stream is diverted to the test fixture and is circulated in a second circulation pattern within the test fixture, the second liquid stream exiting the test fixture and joining the first liquid stream. In some embodiments, the first and second liquid streams are provided by a liquids pump of the circulation bath, a portion of liquid being pumped diverted into a piping arrangement connected to the test fixture. In other embodiments, the liquid is taken from the first liquid stream circulating in the calibration bath and a pressure head is provided by the piping arrangement.

Figure 1:
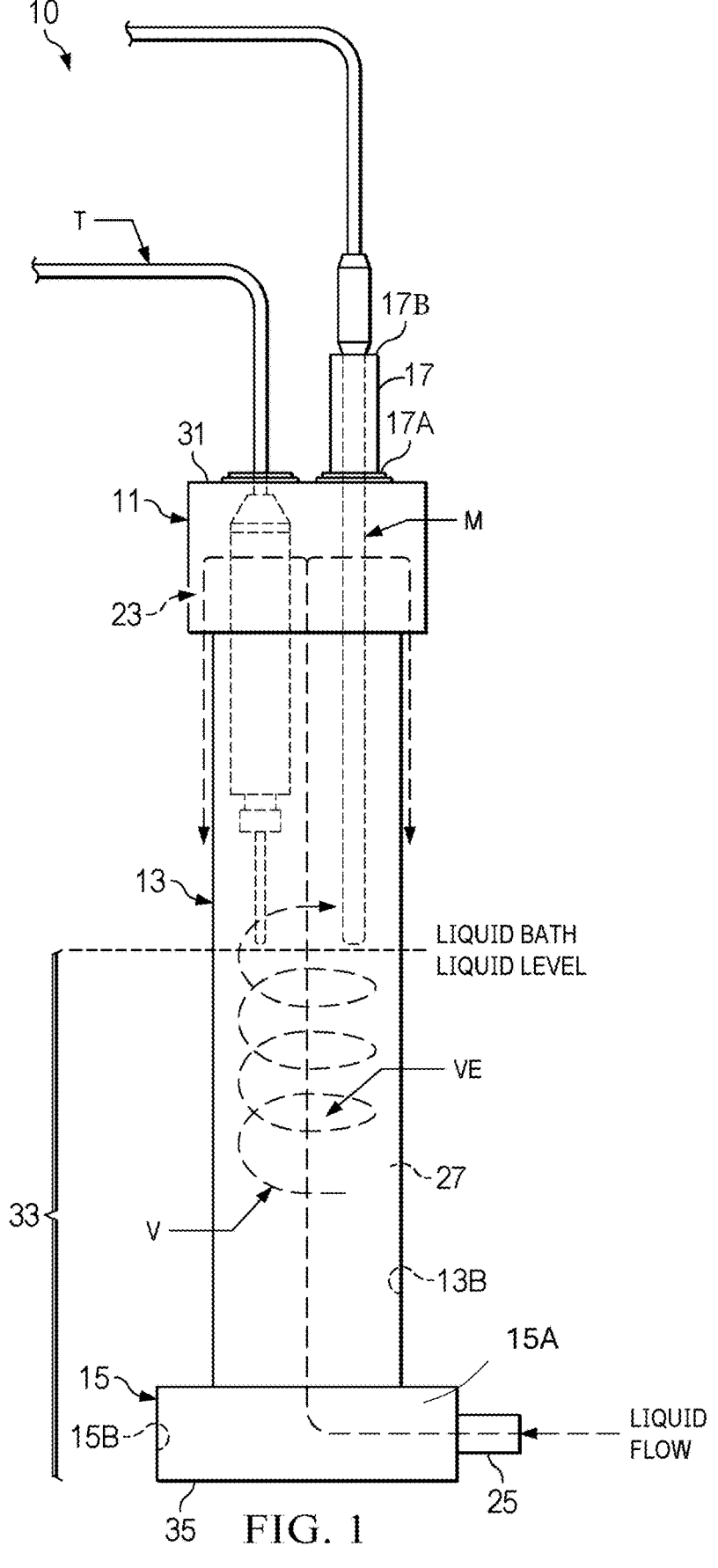
FIG. 1 is a schematic cross-section view of an embodiment of a test fixture of this disclosure.
Figure 2:
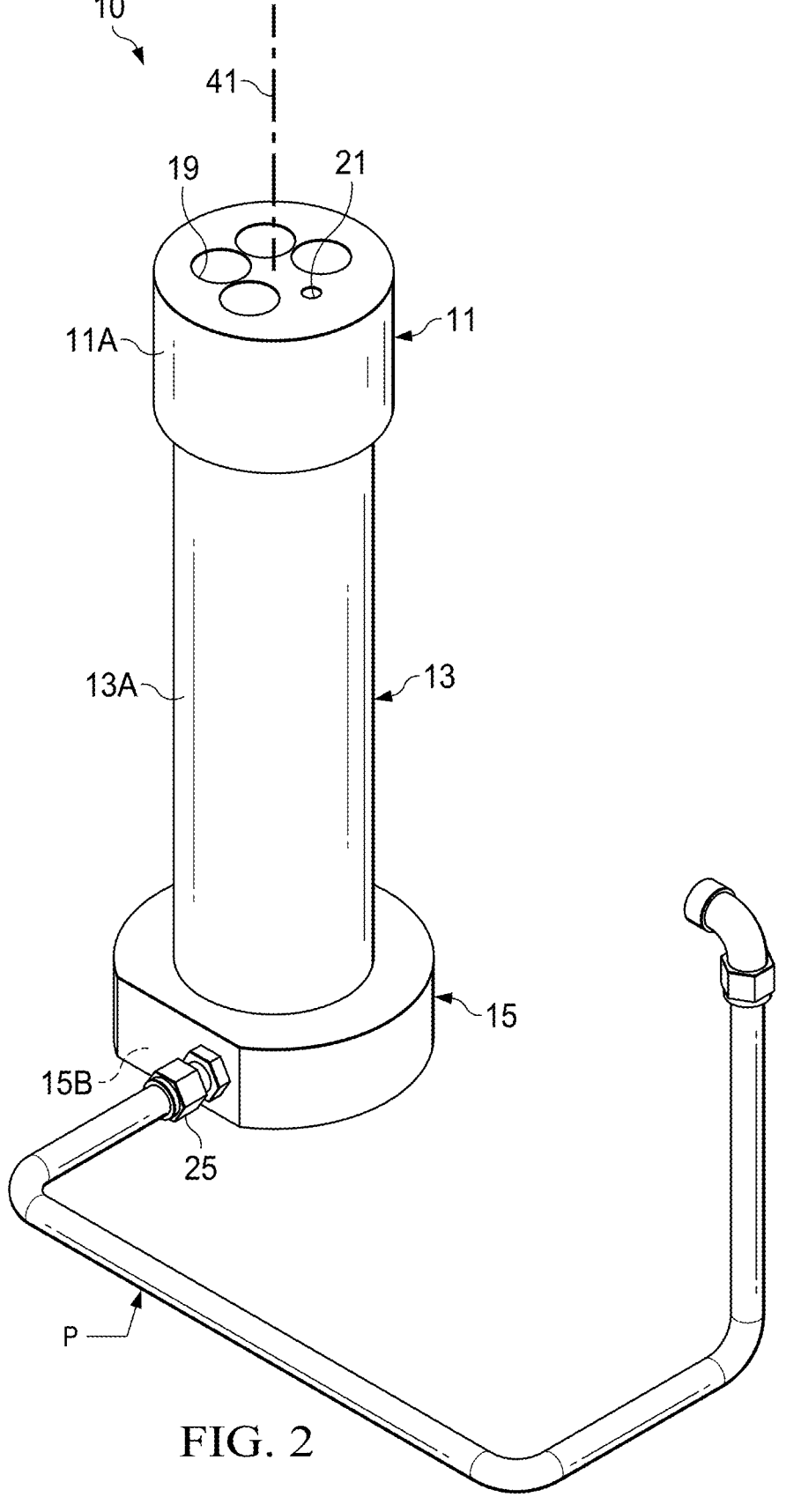
FIG. 2 is an isometric view of the test fixture of FIG. 1.
Figures 3, 4:
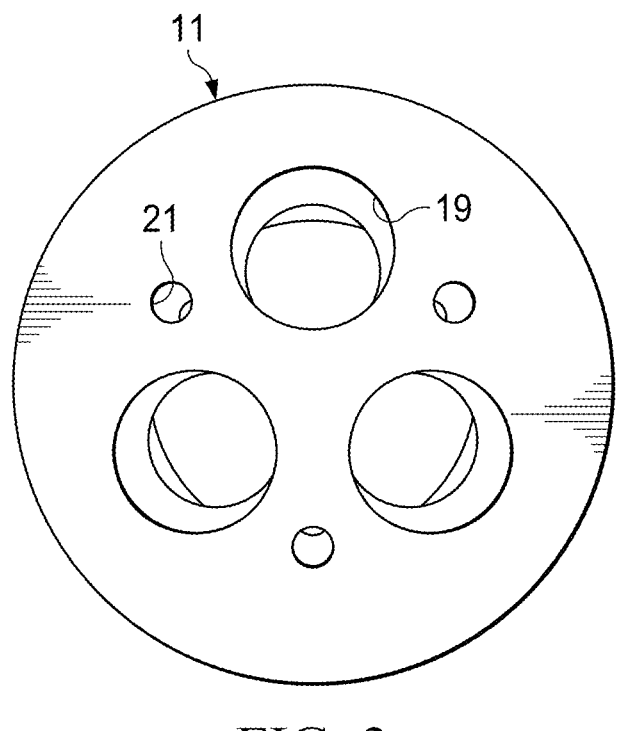
FIG. 3 is a top plan partial perspective view of a cap embodiment of this disclosure.
FIG. 4 is a bottom plan partial perspective view of the cap of FIG. 3.

ELEMENTS AND NUMBERING USED IN THE
DRAWINGS

10 Test device
11 Cap
11A Exterior wall
11B Interior wall
13 Cylinder
13A Exterior wall
13B Interior wall
15 Base
15A Exterior wall
15B Interior wall
17 Sleeve
17A External retaining ring
17B Upper end
19 First openings
21 Second openings
23 Channel
23A Closed top end
23B Open bottom end or liquids outlet
23C Channel wall
25 Inlet
27 Interior space
31 Upper end
33 Lower half
35 Lower end
41 Longitudinal centerline
M Master or reference
T Probe under test
P Piping
V Vortex flow
VE Eye of vortex flow

DESCRIPTION

Referring to the drawings, embodiments of a test fixture 10 of this disclosure include a head or cap 11 at an upper end 35 that properly positions and spaces the thermometer or probes T to be tested, as well as the reference or master thermometer or probe M, and holds them at their correct depth relative to the bath throughout their testing. The test fixture 10 also includes a base 15 at a lower end 31 that includes an inlet 25 connected to a piping P that receives a portion of the liquid entering or circulating in a calibration bath and delivered under positive pressure. Between the base 15 and cap 11 is a longitudinally extending cylinder 13 that contains a portion of the thermometers T, M. The interior 15B of the base 15 is in communication with the interior 27 of the cylinder 13. The liquid exits the base 15 and enters the hollow interior space 27 of the cylinder 13 where it contacts the interior wall 13b and flows upwardly in a vortex flow V. The vortex flow V contacts the thermometers or probes T, M prior to the liquid exiting channels 23 of the cap 11. The liquid then flows downwardly along the exterior wall 13A of the cylinder 13 and returns to a reservoir of the bath (from where it may be recirculated). The liquid flowing downwardly along the exterior wall 13A adds to the temperature stability of the test device 10 by adding a layer of insulation.

A non-limiting example of a liquid circulating bath that may be used with embodiments of the present disclosure is a JULABO® calibration bath. The bath provides a liquids pump that circulates the liquid in the bath and provides ports for attachments. Prior to the liquid entering the piping P and cylinder 13, plumbing systems of a kind known in the art pass the liquid through cooling or heating coils. Controls of a kind known in the art, such as a bath control unit, sets and maintains the liquid of the bath at a predetermined test temperature. Instrumentation of a kind known in the art record temperature readings of the reference thermometer and that of each thermometer being certified.

In embodiments, the liquid of the calibration bath surrounds at least a portion of the exterior 13A of the cylinder 13. For example, the liquid may surround the lower half 33 of the test device, that is, the base 15 and approximately half the height of the cylinder 13. The liquid may be silicone oil or ethylene glycol or any liquid suitable for calibrating the selected thermometer or probe T.

In embodiments, the cylinder 13 may be a metal cylinder such as a brass cylinder. The cylinder 13 may include a head or cap 11 at its upper end 31 that serves to properly space the thermometers T from one another and to locate a bottom end of each thermometer T at a same depth. The cap 11 may be a fixed cap or a removable cap. The inside diameter of the cap 11 is sized to fit onto the outside diameter of the cylinder 13, the interior walls 11B of the cap 11 facing the exterior walls 13A of the cylinder 13.

The cap 11 could be supplied in a standard configuration as well as in a configuration specific to user requirements regarding sizes of probes T to be tested. In embodiments, the cap 11 provides a plurality of spaced apart first openings 19, each first opening 19 sized to receive a thermometer T, one of which may be a reference thermometer M. The spacing ensures each thermometer T remains in an exact location throughout the test relative to the reference thermometer M and to any other thermometers T (whether in a horizontal or a vertical orientation). The cap 11 may also provide one or more second openings 21 The second opening 21 may be smaller in diameter than the first opening 19 and sized to receive the reference thermometer M.

Because of the vortex flow V, in embodiments the cap 11 does not include any openings 19, 21 coaxial with the longitudinal centerline 41 of the test fixture 10. In embodiments, the openings 19, 21 are arrayed about the centerline 41 such that no portion of the openings 19, 21 overlap a center or eye VE of the vortex flow V, thereby placing the thermometers M, T in the flow itself.

To hold the thermometer at a predetermined height or depth, each opening 19, 21 may receive a sleeve 17 into which the thermometer T is inserted. In some embodiments, the sleeve 17 is a rubber grommet or its equivalent. In other embodiments, the sleeve 17 is a threaded sleeve. The sleeve 17 can be an aluminum sleeve fitting and can include an external retaining ring 17A at its top end and an internal retaining ring at its bottom end to set the depth of the thermometer or probe under test. (The aluminum sleeve is not shown in the drawings other than its top with retaining ring 17A.) The aluminum sleeve may be removed and replaced with a polymer sleeve to allow various diameter probes or liquid-in-glass thermometers to be placed for testing. In some embodiments, the sleeve 17, or another sleeve 17, can extend above the cap 11 and may also include a retaining ring 17A at its upper end 17B.

Typically the vortex flow V is such that liquid does not overflow the upper end 31 of the test fixture 10, nor does it escape openings 19, 21. Instead, the liquid is returned by way of a plurality of channels 23 located along the interior wall 11B of the cap 11. The liquid flows between the channel wall 23C and the exterior wall 13A of the cylinder 13. In embodiments, the channels 23 are longitudinally extending, U-shaped channels having a closed upper end 23A and an open bottom end 23B.

In embodiments, the test fixture 10 may be in a range of 11 to 15 inches in height, the base 15 being in a range of 1 to 1½ inches, the cylinder 13 being in a range of 9 to 11 inches, and the head or cap 11 being in a range of 1½ to 2½ inches. In some embodiments, the base 15 is 1¼ inches in height, the cylinder 13 is 10 inches in height, and the cap 11 is 2 inches in height. The diameter or width of the cylinder 13 is less than that of the cap 11 and base 15. In some embodiments, the base 15 is 4 inches in width and the cap 11 is 3 inches. Where higher temperature liquids are used, a splash guard (not shown) may surround a portion of the cap 11 and extend above the upper end 31 of the test fixture 10.

A calibration bath of this disclosure includes a test fixture 10 that contains a probe end of a reference thermometer and at least one thermometer to-be-test, the test fixture 10 including a cylinder 13 that isolates the reference thermometer and the at least one thermometer from a first circulation pattern of liquid in the calibration bath, the first circulation pattern surrounding at least a portion of the test fixture 10, the test fixture 10 adapted to create a second circulation pattern of the liquid within the cylinder 13.

Embodiments of a test fixture 10 of this disclosure may comprise a base 15 including a liquids inlet 25; a cap 11 including a plurality of through openings 17 or 19 arrayed about a center point 41 and a plurality of channels 23 arrayed about an inner wall 11B of the cap 11, each channel having a closed top end 23A, an open bottom end 23B, and a U-shaped channel wall surface 23C; and a cylinder 13 having a hollow interior 27 extending between the base 15 and the cap 11, the U-shaped channel wall surface 23C of the cap 11 located opposite of an exterior wall portion 13A of the cylinder 13; and at least one of a retaining ring 17A sized to be received by a corresponding one of the openings 17 or 19.

Embodiments of a method of this disclosure may comprise providing a first liquid stream circulating in a first circulation pattern in a calibration test bath; and providing a second liquid stream circulating in a second circulation pattern within a test fixture containing a reference thermometer and at least one thermometer to be tested, the first liquid stream surrounding at least a portion of the test fixture; wherein the second circulation pattern is a vortex flow pattern; and wherein the second liquid stream exits toward an upper end of the test fixture and joins the first liquid stream circulating in the first circulation pattern.

While embodiments have been described, the scope of the invention is defined by the following claims, the recited elements of which are entitled to their full range of equivalents.

What is claimed is:

1. A test fixture adapted for use with a calibration bath, the test fixture comprising:
    a base including a liquids inlet;
    a cap including a plurality of through openings arrayed about a center point and a plurality of channels arrayed about an inner wall of the cap, each channel having a closed top end, an open bottom end, and a U-shaped channel wall surface; and
    a cylinder having a hollow interior extending between the base and the cap, the U-shaped channel wall surface of the cap located opposite of an exterior wall portion of the cylinder; and
    at least one retaining ring sized to be received by a corresponding one of the through openings.

2. The test fixture of claim 1, wherein the plurality of channels of the cap comprise a liquids outlet.

3. The test fixture of claim 1, wherein the base and liquids inlet are adapted to provide a vortex flow of liquids through the cylinder.

4. The test fixture of claim 1, further comprising a sleeve extending above an upper end of the cap and arranged concentric to a corresponding one of the through openings.

5. The test fixture of claim 4, wherein the corresponding one of the through openings includes the at least one retaining ring.

6. The test fixture of claim 1, further comprising a reference thermometer and at least one thermometer to be tested, the reference thermometer and the at least one thermometer each being partially housed by a corresponding one of the plurality of through openings of the cap.

7. The test fixture of claim 6, wherein the at least one thermometer is a thermometer chosen from a liquid-in-glass thermometer, a portable electronic thermometer, and a digital contact thermometer.

8. A method for maintaining a bath temperature of a calibration bath, the method comprising:
    providing a first liquid stream circulating in a first circulation pattern in the calibration bath; and
    providing a second liquid stream circulating in a second circulation pattern within a test fixture containing a reference thermometer and at least one thermometer to be tested, the first liquid stream surrounding at least a portion of the test fixture;
    wherein the second circulation pattern is a vortex flow pattern;
    wherein the second liquid stream exits toward an upper end of the test fixture and joins the first liquid stream circulating in the first circulation pattern;
    wherein the test fixture includes:
        a base including a liquids inlet for the second liquid stream;
        a cap including a plurality of through openings arrayed about a center point and a plurality of channels arrayed about an inner wall of the cap, each channel having a closed top end and an open bottom end;
        a cylinder having a hollow interior extending between the base and the cap, the plurality of channels of the cap located opposite of an exterior wall portion of the cylinder; and
        at least one retaining ring sized to be received by a corresponding one of through openings; and
    wherein the base, the hollow interior of the cylinder, and the plurality of channels of the cap form a liquids flow passageway, the plurality of channels comprising a liquids outlet.

9. The method of claim 8, further comprising insulating the test fixture with the second liquid stream after it exits toward the upper end of the test fixture and before it joins the first liquid stream circulating in the first circulation pattern.

10. The method of claim 8, wherein the maintaining of the bath temperature is in a range of ±0.01° F. (±0.0056° C.) about a predetermined bath working temperature.

11. The method of claim 10 wherein the predetermined bath working temperature is a temperature in a range of 32° F. to about 400° F. (about 204° C.).

12. A test fixture adapted for use with a calibration bath, the test fixture comprising:
    a base including a liquids inlet;
    a cap including a plurality of through openings arrayed about a center point and a plurality of channels arrayed about an inner wall of the cap, each channel having a closed top end and an open bottom end;
    a cylinder having a hollow interior extending between the base and the cap, the plurality of channels of the cap located opposite of an exterior wall portion of the cylinder;

wherein the base, the hollow interior of the cylinder, and the plurality of channels of the cap form a liquids flow passageway, the plurality of channels comprising a liquids outlet; and wherein liquids entering the hollow interior of the cylinder experience vortex flow and the liquids exiting the plurality of channels experience flow along the exterior wall portion of the cylinder.

13. The test fixture of claim 12, further comprising a sleeve extending above an upper end of the cap and arranged concentric to a corresponding one of the through openings.

14. The test fixture of claim 12, wherein the corresponding one of the through openings includes the at least one retaining ring.

15. The test fixture of claim 12, further comprising a reference thermometer and at least one thermometer to be tested, the reference thermometer and the at least one thermometer each being partially housed by a corresponding one of the plurality of through openings of the cap.

16. The test fixture of claim 15, wherein the at least one thermometer is a thermometer chosen from a liquid-in-glass thermometer, a portable electronic thermometer, and a digital contact thermometer.

* * * * *